United States Patent [19]

Yamashita et al.

[11] Patent Number: 4,544,644
[45] Date of Patent: Oct. 1, 1985

[54] HIGH DIELECTRIC CONSTANT TYPE CERAMIC COMPOSITION

[75] Inventors: Youhachi Yamashita, Yokohama; Takashi Takahashi, Tokyo; Mituo Harata, Kawasaki, all of Japan

[73] Assignee: Tokyo Shibaura Denki Kabushiki Kaisha, Kawasaki, Japan

[21] Appl. No.: 593,119

[22] Filed: Mar. 26, 1984

[30] Foreign Application Priority Data

Mar. 31, 1983 [JP] Japan .................................. 58-53785

[51] Int. Cl.$^4$ .............................................. C04B 35/00
[52] U.S. Cl. .................................................. 501/134
[58] Field of Search .................. 501/134, 112; 159/89; 361/320, 321

[56] References Cited

U.S. PATENT DOCUMENTS

| | | | |
|---|---|---|---|
| 4,078,938 | 3/1978 | Yonezawa et al. | 106/39.5 |
| 4,265,668 | 5/1981 | Fujiwara et al. | 501/134 |
| 4,379,319 | 4/1983 | Wilson | 501/134 |
| 4,386,387 | 5/1983 | Tanei et al. | 501/134 |

FOREIGN PATENT DOCUMENTS

| | | | |
|---|---|---|---|
| 0110498 | 8/1979 | Japan | 501/134 |
| 55-34962 | 9/1980 | Japan . | |
| 56-156609 | 12/1981 | Japan . | |
| 0011871 | 1/1982 | Japan | 501/134 |

Primary Examiner—William R. Dixon, Jr.
Assistant Examiner—Karl Group
Attorney, Agent, or Firm—Schwartz, Jeffery, Schwaab, Mack, Blumenthal & Evans

[57] ABSTRACT

There is disclosed a high dielectric constant material which comprises a composite material comprising at least one of BaO and CaO; PbO; $Fe_2O_3$; $Nb_2O_5$; $WO_3$ and CuO, said composite material being represented by the general formula:

$$xPb(Fe_{1/2} Nb_{1/2})O_3\text{-}yM(Cu_{1/2} W_{1/2})O_3\text{-}zPb(Fe_{2/3} W_{1/3})O_3$$

wherein M is at least one of Ba and Ca, and x, y and z are defined in the specification.

The disclosed dielectric material can also contain 0 to 1.0% by weight, relative to said composite material, of manganese oxide.

4 Claims, 10 Drawing Figures

HIGH DIELECTRIC CONSTANT TYPE CERAMIC COMPOSITION

BACKGROUND OF THE INVENTION

This invention relates to high dielectric constant type ceramic compositions, more particularly to low-temperature sintering type ceramic compositions which are suitable for multilayer capacitors having a high dielectric constant and which can be synthesized by a solid phase reaction of a composite material of oxides.

As compositions having a high dielectric constant, composite dielectric ceramics have heretofore widely been used in which barium titanate ($BaTiO_3$) is included as a main component, and calcium zirconate ($CaZrO_3$) and calcium titanate ($CaTiO_3$) are further present.

These ceramics must be sintered usually at a temperature as high as 1200° to 1400° C., so that for multilayer capacitors including these ceramics, it is disadvantageously required to employ internal electrodes each comprising mainly an expensive noble metal such as gold, platinum or palladium which can withstand co-firing at such a high temperature.

Further, in sintering these ceramics, a great deal of heat energy of electric power, a gas or the like is necessary because of a treatment at elevated temperatures, and in consequence a used sintering furnace, sintering crucibles or the like will thus be prematurely deteriorated due to the heat, which fact disadvantageously becomes one cause for the increase in costs for the ceramic capacitors.

For this reason, there has been desired a development of compositions which permit employing inexpensive internal electrodes each composed of sliver or the like as a main component; accomplishing the sintering operation even at a temperature as low as 1000° C. or less; and providing the ceramics having a large dielectric constant and a small dielectric loss.

Materials comprising $Pb(Fe_{\frac{2}{3}}W_{\frac{1}{3}})_x(Fe_{\frac{1}{2}}Nb_{\frac{1}{2}})_{1-x}O_3$ (wherein x is in the relation of $0.2 \leq x \leq 0.5$) are known which have been developed in reply to the aforesaid desire and are described in Japanese Provisional Patent Publication No. 87700/1977 (which corresonds to U.S. Pat. No. 4,078,938). Further, an attempt to add $SiO_2$ to the aforesaid materials has been made in Japanese Provisional Patent Publication No. 15591/1978. These mateials are, however, large in temperature dependence of the dielectric loss (tan δ), and hence, when the multilayer capacitors are prepared by the use of such materials, they will be unpracticable.

Moreover, the multilayer capacitors which have been manufactured from the aforesaid materials are weak particularly in mechanical strength and thus have the serious practical problem that cracks and breakage are liable to occur.

An object of this invention is accordingly to provide low-temperature sintering type ceramic compositions having a high dielectric constant by which the aforementioned drawbacks are eliminated and which are high in dielectric constant, are excellent in temperature dependence of tan δ, mechanical strength and bias dependence of the dielectric constant, and are improved in high-temperature load properties and moisture resistance.

SUMMARY OF THE INVENTION

The high dielectric constant type ceramic compositions according to this invention are each composed of at least one of barium oxide and calcium oxide; lead oxide; iron oxide; niobium oxide; tungsten oxide; and copper oxide, and it is characterized in that when the ceramic composition is represented by the general formula:

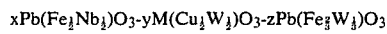

wherein M is at least one of Ba and Ca, and when A, B, C and D are defined as follows:

| A: | x = 65,   | y = 5,   | z = 30,       |
|----|-----------|----------|---------------|
| B: | x = 90,   | y = 10,  | z = 0,        |
| C: | x = 65,   | y = 0.5, | z = 34.5, and |
| D: | x = 99.5, | y = 0.5, | z = 0;        | and 0 to 1.0% by weight of manganese oxide (MnO) with respect to the ceramic composition having a high dielectric constant within a compositional range surrounded by the above defined A, B, C and D is further included in the ceramic composition.

DESCRIPTION OF THE PREFERRED EMBODIMENTS

The reason why components employed in this invention are limited as follows.

First, when the ceramic compositions according to this invention are represented by the formula;

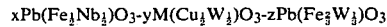

wherein M is at least one of Ba and Ca, the components of the ceramic composition are limited to the range surrounded by the following A, B, C and D:

| A: | x = 65,   | y = 5,   | z = 30,       |
|----|-----------|----------|---------------|
| B: | x = 90,   | y = 10,  | z = 0,        |
| C: | x = 65,   | y = 0.5, | z = 34.5, and |
| D: | x = 99.5, | y = 0.5, | z = 0;        | because when x is less than 65, the dielectric constant at room temperature will be lowered, so that the resulting composition will not be eligible as the material for the capacitor; when y is less than 0.5, the effects of $M(Cu_{\frac{1}{2}}W_{\frac{1}{2}})O_3$ (M: Ba and/or Ca), which can lower sintering temperature and the tan δ and can improve DC bias properties of the dielectric constant and enhance mechanical strength, will be almost negligible; and when y exceeds 10, the tan δ will increase.

The compound MnO to be used in this invention serves to improve temperature dependence of the tan δ of the ceramic compositions and high-temperature load properties as well as moisture and temperature resistances of the manufactured multilayer chip capacitors, and the amount of the additive MnO is within the range of 0 to 1.0% by weight, preferably 0.01 to 1.0% by weight. The reason why the amount of the MnO is restricted to 1.0% by weight or less is that when its amount is in excess of 1.0% by weight, the tan δ of the obtained ceramics will increase.

Figure 1:
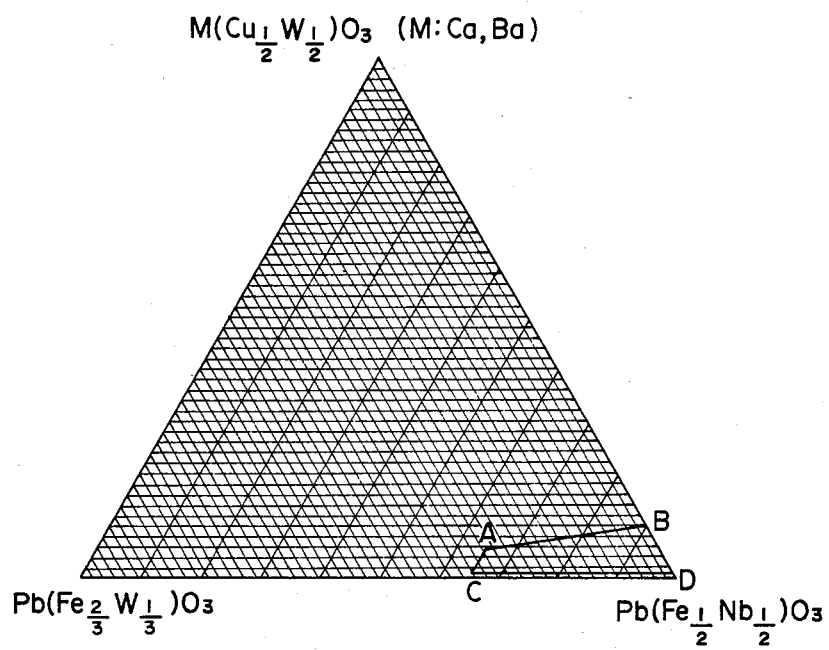
FIG. 1 is a three-component composition diagram illustrating a compositional range of ceramic compositions according to this invention.
Figure 2:
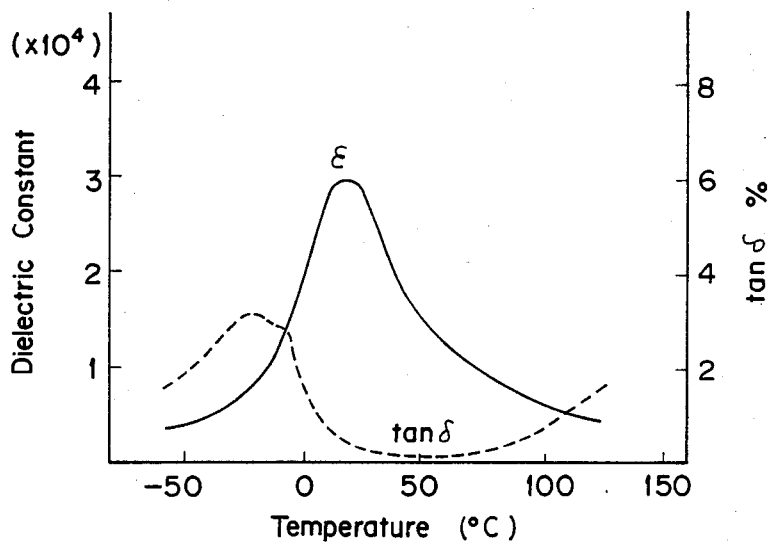
FIGS. 2 to 5 show curves illustrating properties of the high dielectric constant type ceramic compositions according to this invention.
Figure 3:
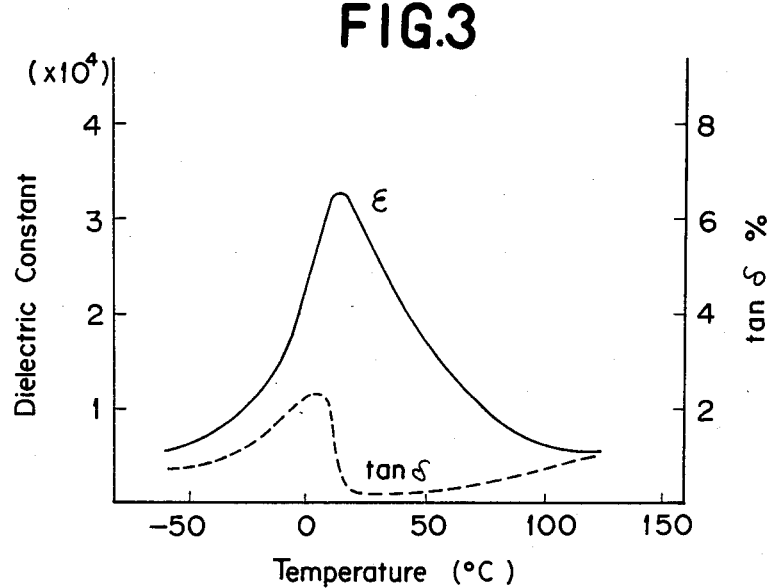
Figure 4:
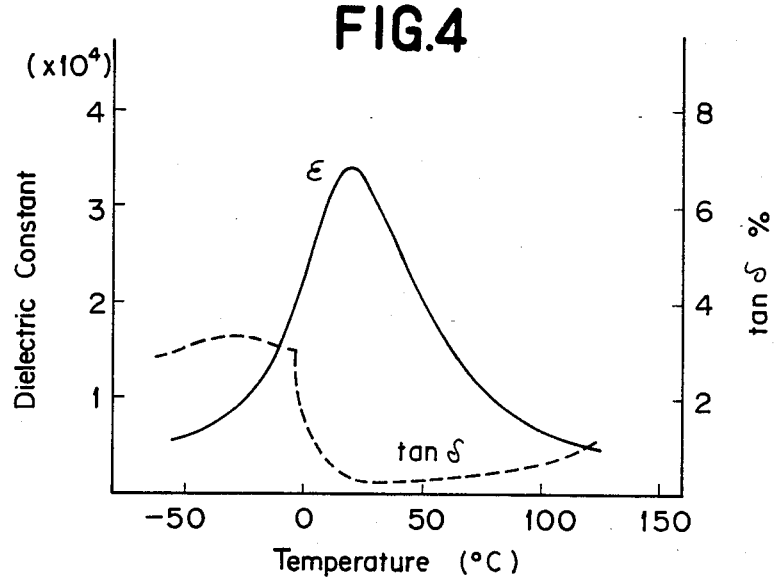
Figure 5:
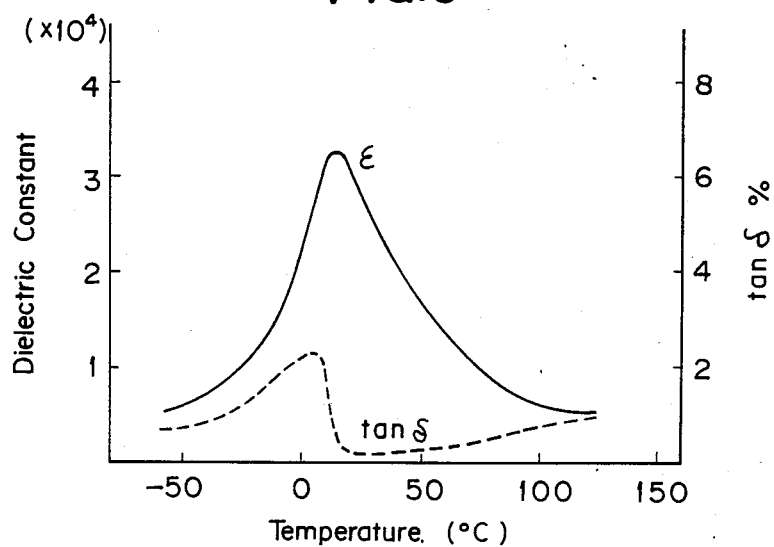
Figure 6:
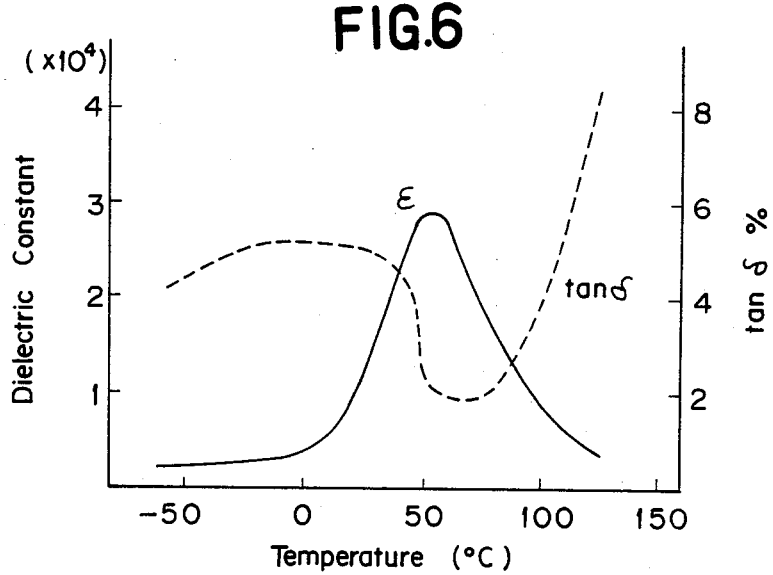
FIGS. 6 to 9 likewise show curves illustrating properties of ceramic composition having a high dielectric constant obtained in Reference Examples.
Figure 7:
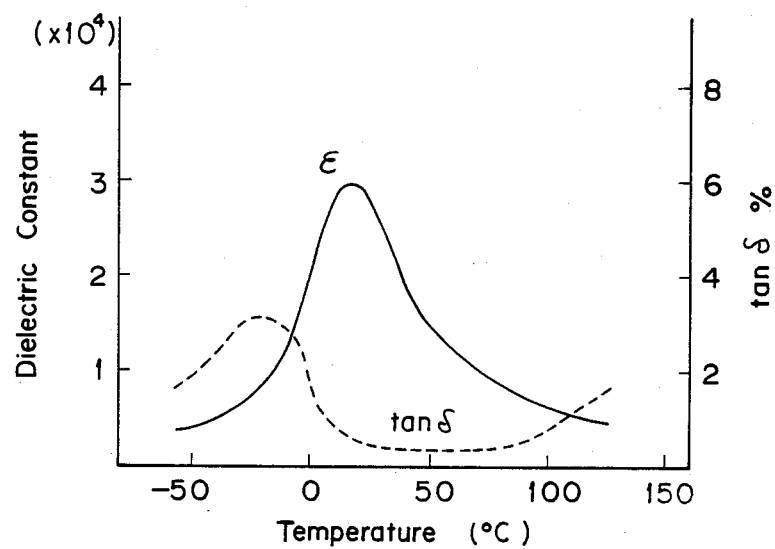
Figure 8:
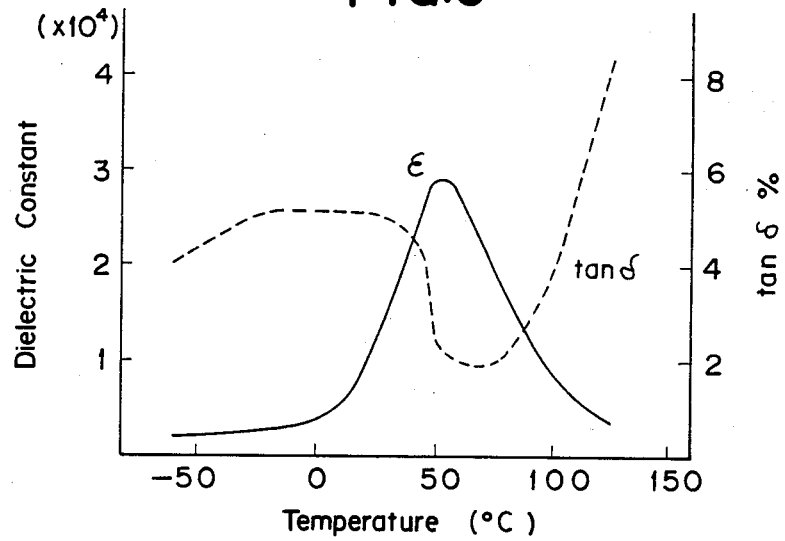
Figure 9:
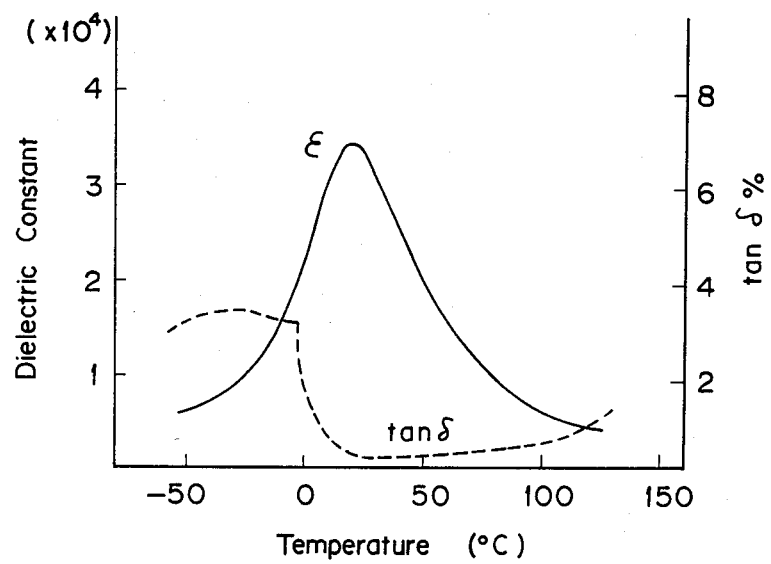

Now, FIG. 1 shows a three-component composition diagram of the aforementioned composition (exclusive of MnO).

The high dielectric constant type ceramic compositions according to this invention may be manufactured, for example, as follows:

At a first step, starting materials of lead oxide (PbO), iron oxide ($Fe_2O_3$), tungsten oxide ($WO_3$), niobium oxide ($Nb_2O_5$), calcium carbonate ($CaCO_3$), barium carbonate ($BaCO_3$), copper oxide (CuO), manganese carbonate ($MnCO_3$) and the like are employed, and they are weighed in a formulating proportion of this invention. These materials are mixed under a wet condition by means of a ball mill, followed by calcining at a temperature of 700° to 800° C. Next, a milling operation is carried out by the ball mill again, and a binder such as a polyvinyl alcohol (PVA) or the like is then added to the milled and dried powder, followed by preparing disk-like bodies of 16.0 mm in diameter and 1.2 mm in thickness under a pressure of approximately 0.8 ton/cm². The thus molded disks are placed in a crucible made of magnesia, and a sintering is then accomplished at a temperature of 850° to 950° C. for a period of 2 hours. Further, a silver paste is printed on the resulting sinters at a temperature of 600° to 700° C. in order to obtain the desired ceramic compositions according to this invention.

The compositions according to this invention can be applied to the ceramic multilayer capacitors, for example, in the following manner.

First, the compositional materials used in the present invention are mixed under a wet condition, and after sintering, milling and drying have been carried out to prepare a powder, a binder such as polyvinyl butyral, polyethylene glycol or octyl phthalate and a solvent such as trichloroethylene or ethyl alcohol are suitably added to the powder in order to prepare a slurry. Then, the slurry is formed into sheets of approximately 50 μm in thickness by the use of a doctor blade, and electrodes are printed on the sheets, which are then laminated. The resulting laminated sheet material is cut into several chips and integrally sintered, and termination electrodes are attached to the resulting chips, thereby obtaining the desired ceramic multilayer capacitors.

This invention will be further described in detail in reference to Examples below, but it is not to be intended that any restriction of this invention is made by them.

EXPERIMENT 1

Lead oxide (PbO), iron oxide ($Fe_2O_3$), tungsten oxide ($WO_3$), niobium oxide ($Nb_2O_5$), calcium carbonate ($CaCO_3$), barium carbonate ($BaCO_3$), copper oxide (CuO) and manganese carbonate ($MnCO_3$) were used as starting materials, and they were weighed in formulating proportions shown in Table 1. The materials for each sample were mixed under a wet condition by means of a ball mill, followed by calcining at 700° to 800° C. Subsequently, the resulting powder is milled by the ball mill again and dried to prepare a powder. A polyvinyl alcohol as a binder was added to the powder, and after a mixing operation, forming was carried out under a pressure of approximately 0.8 ton/cm², thereby obtaining disk-like molded specimens each having a diameter of 16.0 mm and a thickness of 1.2 mm. These formed specimens were placed in a crucible made of magnesia, and a sintering was accomplished at a temperature of 850° to 950° C. for a period of 2 hours, as set forth in Table 1. A silver paste was printed on the resulting disks to obtain 68 samples (Examples 1 to 68).

For these samples, dielectric constant, dielectric loss (tan δ) and resistivity were measured. Results obtained are all set forth in Table 1. The measurement of the aforesaid dielectric constant and sielectric loss were carried out at a frequency of 1 KHz.

COMPARATIVE EXPERIMENT

The same procedure as in Experiment 1 was repeated with the exception that proportions of the starting materials were varied as in Reference Examples of Table 1, in order to prepare 12 samples (Reference Examples 1 to 12).

For these samples, dielectric constant, tan δ and resistivity were measured in the same manner as in Experiment 1. Results obtained are set forth together in Table 1.

TABLE 1

|  |  | $Pb(Fe_{\frac{1}{2}}Nb_{\frac{1}{2}})O_3$ x(mole %) | $Pb(Fe_{\frac{2}{3}}W_{\frac{1}{3}})O_3$ z(mole %) | $M(Cu_{\frac{1}{2}}W_{\frac{1}{2}})O_3$ y(mole %) | | MnO wt % | Sintering Temperature (°C.) | Dielectric constant | tan δ (%) | Resistivity (Ω.cm) |
|---|---|---|---|---|---|---|---|---|---|---|
| Example | 1 | 99.5 | — | M = Ca | 0.5 | — | 920 | 11300 | 2.1 | $2 \times 10^{11}$ |
| " | 2 | 90 | — | " | 10 | — | 860 | 12500 | 2.9 | $3 \times 10^{11}$ |
| " | 3 | 95 | 1 | " | 4 | — | 880 | 21300 | 1.6 | $2 \times 10^{11}$ |
| " | 4 | 90 | 5 | " | 5 | — | 880 | 26000 | 0.7 | $5 \times 10^{11}$ |
| " | 5 | 90 | 7 | " | 3 | — | 900 | 21000 | 2.2 | $2 \times 10^{11}$ |
| " | 6 | 85 | 10 | " | 5 | — | 880 | 20300 | 0.9 | $5 \times 10^{11}$ |
| " | 7 | 85 | 12 | " | 3 | — | 900 | 29200 | 0.4 | $4 \times 10^{11}$ |
| " | 8 | 85 | 14 | " | 1 | — | 920 | 19600 | 1.5 | $3 \times 10^{10}$ |
| " | 9 | 80 | 19 | " | 1 | — | 920 | 20000 | 0.9 | $6 \times 10^{10}$ |
| " | 10 | 80 | 18 | " | 2 | — | 900 | 23000 | 0.5 | $2 \times 10^{11}$ |
| " | 11 | 80 | 16 | " | 4 | — | 880 | 14200 | 0.9 | $5 \times 10^{11}$ |
| " | 12 | 80 | 14 | " | 6 | — | 880 | 10200 | 1.2 | $5 \times 10^{11}$ |
| " | 13 | 75 | 24 | " | 1 | — | 920 | 15300 | 0.8 | $5 \times 10^{10}$ |
| " | 14 | 75 | 22 | " | 3 | — | 900 | 26200 | 0.8 | $6 \times 10^{11}$ |
| " | 15 | 70 | 28 | " | 2 | — | 900 | 19900 | 0.6 | $9 \times 10^{10}$ |
| " | 16 | 65 | 34.5 | " | 0.5 | — | 920 | 26600 | 1.4 | $4 \times 10^{10}$ |
| " | 17 | 65 | 30 | " | 5 | — | 880 | 14800 | 1.0 | $1 \times 10^{11}$ |
| Reference Example | 1 | 80 | 20 | | 0 | — | 950 | 8400 | 5.3 | $8 \times 10^7$ |
| Reference Example | 2 | 70 | 30 | | 0 | — | 950 | 20300 | 4.6 | $6 \times 10^7$ |

TABLE 1-continued

|  | $Pb(Fe_{1/2}Nb_{1/2})O_3$ x(mole %) | $Pb(Fe_{2/3}W_{1/3})O_3$ z(mole %) | $M(Cu_{1/2}W_{1/2})O_3$ y(mole %) | MnO wt % | Sintering Temperature (°C.) | Dielectric constant | tan δ (%) | Resistivity (Ω.cm) |
|---|---|---|---|---|---|---|---|---|
| Reference Example 3 | 60 | 40 |  | 0 | — | 950 | 19500 | 3.7 | $5 \times 10^7$ |
| Example 18 | 95 | — | M = Ca 5 | 0.05 | 900 | 22000 | 0.4 | $4 \times 10^{11}$ |
| " 19 | 90 | — | " 10 | 1.0 | 860 | 12000 | 2.2 | $6 \times 10^{11}$ |
| " 20 | 95 | 1 | " 4 | 0.5 | 880 | 22000 | 1.5 | $6 \times 10^{11}$ |
| " 21 | 90 | 5 | " 5 | 0.8 | 880 | 25800 | 0.7 | $5 \times 10^{11}$ |
| " 22 | 90 | 7 | " 3 | 0.5 | 900 | 22000 | 1.9 | $4 \times 10^{11}$ |
| " 23 | 85 | 10 | " 5 | 0.5 | 880 | 21600 | 0.8 | $1 \times 10^{12}$ |
| " 24 | 85 | 12 | " 3 | 0.25 | 900 | 32500 | 0.25 | $9 \times 10^{11}$ |
| " 25 | 85 | 14 | " 1 | 0.25 | 920 | 20000 | 1.0 | $2 \times 10^{11}$ |
| " 26 | 80 | 19 | " 1 | 0.25 | 920 | 20500 | 0.4 | $2 \times 10^{11}$ |
| " 27 | 80 | 18 | " 2 | 0.25 | 900 | 23500 | 0.5 | $5 \times 10^{11}$ |
| " 28 | 80 | 16 | " 4 | 0.25 | 880 | 14000 | 0.7 | $7 \times 10^{11}$ |
| " 29 | 80 | 14 | " 6 | 0.1 | 880 | 10600 | 1.0 | $8 \times 10^{11}$ |
| " 30 | 75 | 24 | " 1 | 0.1 | 920 | 16200 | 0.7 | $2 \times 10^{11}$ |
| " 31 | 75 | 22 | " 3 | 0.1 | 900 | 27000 | 0.7 | $9 \times 10^{11}$ |
| " 32 | 70 | 28 | " 2 | 0.1 | 900 | 19400 | 0.4 | $2 \times 10^{11}$ |
| " 33 | 65 | 34.5 | " 0.5 | 0.5 | 920 | 25000 | 1.1 | $2 \times 10^{11}$ |
| " 34 | 65 | 30 | " 5 | 0.5 | 880 | 15000 | 0.8 | $5 \times 10^{11}$ |
| Reference Example 4 | 80 | 20 |  | 0 | 0 | 950 | 8400 | 5.3 | $8 \times 10^7$ |
| Reference Example 5 | 65 | 12 | M = Ca 3 | 0 | 900 | 29200 | 0.4 | $4 \times 10^{11}$ |
| Reference Example 6 | 60 | 40 |  | 0 | 2.0 | 950 | 18000 | 6.3 | $2 \times 10^6$ |
| Example 35 | 95 | — | M = Ba 5 | — | 900 | 19000 | 0.8 | $3 \times 10^{11}$ |
| " 36 | 90 | — | " 10 | — | 860 | 16500 | 2.6 | $2 \times 10^{11}$ |
| " 37 | 95 | 1 | " 4 | — | 880 | 22300 | 2.2 | $4 \times 10^{11}$ |
| " 38 | 90 | 5 | " 5 | — | 880 | 19500 | 1.6 | $7 \times 10^{11}$ |
| " 39 | 90 | 7 | " 3 | — | 900 | 25300 | 2.0 | $5 \times 10^{11}$ |
| " 40 | 85 | 10 | " 5 | — | 880 | 29000 | 0.7 | $4 \times 10^{11}$ |
| " 41 | 85 | 12 | " 3 | — | 900 | 26500 | 0.95 | $2 \times 10^{11}$ |
| " 42 | 85 | 14 | " 1 | — | 920 | 21000 | 1.6 | $4 \times 10^{10}$ |
| " 43 | 80 | 19 | " 1 | — | 920 | 20000 | 1.0 | $5 \times 10^{10}$ |
| " 44 | 80 | 18 | " 2 | — | 900 | 33000 | 0.3 | $6 \times 10^{10}$ |
| " 45 | 80 | 16 | " 4 | — | 880 | 22000 | 0.9 | $7 \times 10^{11}$ |
| " 46 | 80 | 14 | " 6 | — | 880 | 11600 | 0.8 | $8 \times 10^{11}$ |
| " 47 | 75 | 24 | " 1 | — | 920 | 17800 | 0.9 | $3 \times 10^{11}$ |
| " 48 | 75 | 22 | " 3 | — | 900 | 29200 | 0.6 | $6 \times 10^{10}$ |
| " 49 | 70 | 28 | " 2 | — | 900 | 22000 | 0.8 | $5 \times 10^{11}$ |
| " 50 | 65 | 34.5 | " 0.5 | — | 920 | 28000 | 1.6 | $5 \times 10^{11}$ |
| " 51 | 65 | 30 | " 5 | — | 880 | 19900 | 0.9 | $2 \times 10^{10}$ |
| Reference Example 7 | 80 | 20 |  | 0 | — | 950 | 8400 | 5.3 | $8 \times 10^7$ |
| Reference Example 8 | 70 | 30 |  | 0 | — | 950 | 20300 | 4.6 | $6 \times 10^7$ |
| Reference Example 9 | 60 | 40 |  | 0 | — | 950 | 19500 | 3.7 | $5 \times 10^7$ |
| Example 52 | 95 | — | M = Ba 5 | 0.05 | 900 | 19200 | 0.7 | $4 \times 10^{11}$ |
| " 53 | 90 | — | " 10 | 1.0 | 860 | 15500 | 2.5 | $3 \times 10^{11}$ |
| " 54 | 95 | 1 | " 4 | 0.5 | 880 | 24000 | 2.0 | $6 \times 10^{11}$ |
| " 55 | 90 | 5 | " 5 | 0.8 | 880 | 19000 | 1.5 | $7 \times 10^{11}$ |
| " 56 | 90 | 7 | " 3 | 0.5 | 900 | 26200 | 1.5 | $8 \times 10^{11}$ |
| " 57 | 85 | 10 | " 5 | 0.5 | 880 | 29500 | 0.5 | $8 \times 10^{11}$ |
| " 58 | 85 | 12 | " 3 | 0.25 | 900 | 25200 | 0.6 | $4 \times 10^{11}$ |
| " 59 | 85 | 14 | " 1 | 0.25 | 920 | 22000 | 1.1 | $5 \times 10^{11}$ |
| " 60 | 80 | 19 | " 1 | 0.25 | 920 | 20500 | 0.9 | $1 \times 10^{11}$ |
| " 61 | 80 | 18 | " 2 | 0.25 | 900 | 34000 | 0.2 | $1 \times 10^{12}$ |
| " 62 | 80 | 16 | " 4 | 0.25 | 880 | 22400 | 0.5 | $9 \times 10^{11}$ |
| " 63 | 80 | 14 | " 6 | 0.1 | 880 | 12900 | 0.7 | $1 \times 10^{12}$ |
| " 64 | 75 | 24 | " 1 | 0.1 | 920 | 15000 | 0.6 | $2 \times 10^{11}$ |
| " 65 | 75 | 22 | " 3 | 0.1 | 900 | 30000 | 0.5 | $7 \times 10^{11}$ |
| " 66 | 70 | 28 | " 2 | 0.1 | 900 | 23300 | 0.5 | $6 \times 10^{11}$ |
| " 67 | 65 | 34.5 | " 0.5 | 0.5 | 920 | 28500 | 1.3 | $1 \times 10^{11}$ |
| " 68 | 65 | 30 | " 5 | 0.5 | 880 | 19900 | 0.7 | $3 \times 10^{11}$ |
| Reference Example 10 | 80 | 20 |  | 0 | 0 | 950 | 8400 | 5.3 | $8 \times 10^7$ |
| Reference Example 11 | 80 | 18 | M = Ba 2.0 | 0 | 950 | 33000 | 0.4 | $6 \times 10^{11}$ |
| Reference Example 12 | 60 | 40 |  | 0 | 2.0 | 950 | 18000 | 6.3 | $2 \times 10^6$ |

Reference Examples in Table 1 are outside the range of this invention and are included for comparison.

As shown in Table 1, the sample within the range of this invention exhibit as high dielectric constants as 29,200 to 34,000 in some cases, and permit the sintering temperature of not more than 900° C. under as extremely small dielectric losses as 0.2 to 0.4%.

Further, FIGS. 2, 3, 4 and 5 exhibit the temperature dependence of the dielectric constant and the tan δ in Examples 7, 24, 44 and 61, respectively. In addition, FIGS. 6, 7, 8 and 9 exhibit the temperature dependence of the dielectric constant and the tan δ in Reference Examples 1, 5, 7 and 11, respectively, for reference.

As is apparent from Table 1 and FIGS. 2 to 9, in the cases of the materials each including the compound $M(Cu_{\frac{1}{2}}W_{\frac{1}{2}})O_3$ in the form of a solid solution according to this invention, the dielectric constant is outstandingly improved and is 3.5 to 4 times larger than a conventional one. Moreover, it is clear that the dielectric loss tan δ is noticeably lowered up to 1/10 or less of a conventional level.

The addition of a small amount of MnO permits the tan δ at a low temperature (−55° C.) to be remarkably lowered up to approximately ½ to 1/5 of a conventional level, and it is to be noted that the dielectric loss tan δ at a high temperature of 125° C. is also reduced up to approximately ⅔ to ½ of a conventional level.

EXPERIMENT 2

With regard to the samples of Examples 18 and 58, among the samples prepared in Experiment 1, as well as Reference Example 2, bias dependence of the dielectric constant was examined. The samples to be examined were formed to a thickness of 0.2 mm, and silver electrodes were then attached thereto, they being 13 mm in diameter. Results obtained are presented in FIG. 10. In this drawing, curves a, b and c correspond to Example 18, Example 58 and Reference Example 2, respectively.

Figure 10:
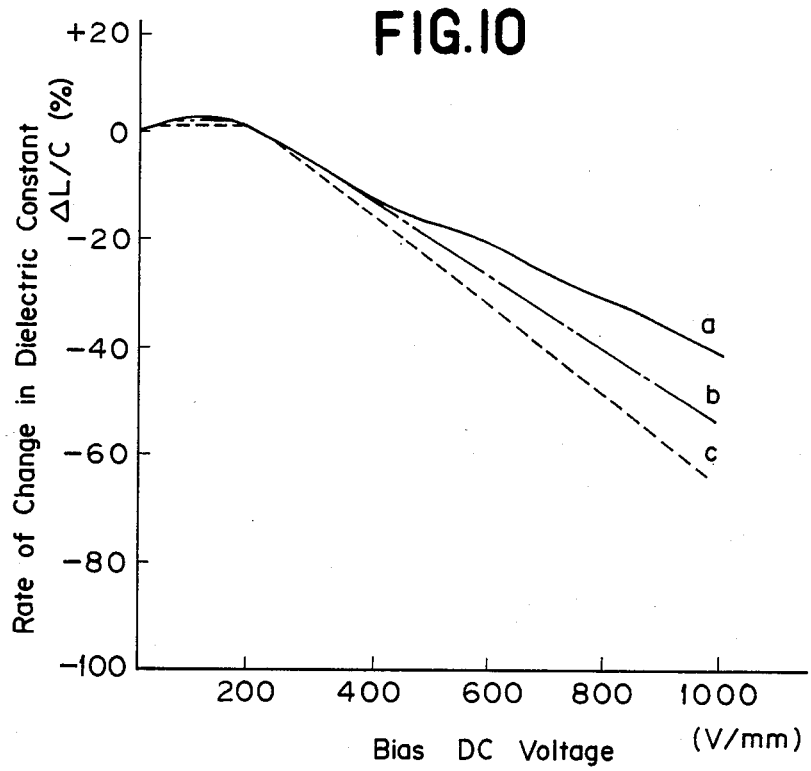
FIG. 10 shows curves illustrating bias dependences dielectric constants.

As be apparent from FIG. 10, the three samples are substantially almost similar in the dielectric constant, but it has been confirmed that the samples including $Ca(Cu_{\frac{1}{2}}W_{\frac{1}{2}})O_3$ and $Ba(Cu_{\frac{1}{2}}W_{\frac{1}{2}})O_3$ in amounts of 5 mole % and 3 mole %, respectively, are small in the bias dependence or the dielectric constant, which fact is practically advantageous.

EXPERIMENT 3

With regard to some of the samples prepared in Experiment 1, mechanical strength was examined, together with samples of several Reference Examples.

For the estimate of the mechanical strength, a bending strength was employed. The measurement of the bending strength was carried out as follows.

Each dielectric ceramic disk obtained was lapped on both the surfaces thereof up to a thickness of 1 mm in order to finish it in the state of a mirror surface. Afterward, by means of a diamond cutter, a sample piece having a width of 3 mm was cut off from the central portion of each disk, and exposed cut surfaces thereof were abraded with SiC sand papers in order of #800, #1500 and #2000 thereof. Finishing was then carried out by rounding edges of the plates, and a three-point bending test was carried out by the use of an Instron type universal tester.

The bending strength (deflective strength) can be obtained by the following formula:

Deflective strength $=(3/2) \cdot (Pml/d^2w)$ wherein
Pm is a maximum breaking load (kg);
l is a distance (cm) between supporting points;
d is a thickness (cm) of a sample; and
W is a width (cm) of the sample.

Data of the Examples regarding this invention are set forth in Table 2 together with those of Reference Examples.

TABLE 2

|  | Bending strength [kg/cm²] |
|---|---|
| Example - 7 | 870 |
| Example - 10 | 820 |
| Reference Example - 1 | 590 |
| Example - 24 | 890 |
| Example - 27 | 850 |
| Reference Example - 4 | 590 |
| Example - 40 | 880 |
| Example - 44 | 790 |
| Reference Example - 7 | 590 |
| Example - 57 | 900 |
| Example - 61 | 800 |
| Reference Example - 10 | 560 |

The results in Table 2 definitely indicate that the addition of a small amount of $M(Cu_{\frac{1}{2}}W_{\frac{1}{2}})O_3$ (M: Ba and/or Ca) in the form of a solid solution also permits a remarkable improvement in the mechanical strength.

EXPERIMENT 4

Multilayer capacitors were prepared from some samples obtained in Experiment 1, and a high-temperature load test and a moisture-resistant test were carried out.

These capacitors to be used for these tests were obtained as follows.

To each sintered powder were added suitable amounts of a binder selected from polyvinyl butyral, polyethylene glycol or octyl phthalate and a solvent such as trichloroethylene or ethyl alcohol in order to prepare a usual slurry. Afterward, a doctor blade was utilized to form the slurry into sheets of 50 μm in thickness, and electrodes were then printed on the sheets. A plurality of the printed sheets was laminated, cut and sintered. Finally, termination electrodes were attached to the sintered chips in order to prepare multilayer ceramic capacitors each having 4.5 mm × 3.2 mm and 1 μF. One hundred multilayer capacitors were subjected to the high-temperature load test and the moisture-resistant test which are described in the paragraph of Multilayer Capacitors (Chip-form) for Electric Eqipments of Nippon Denki Kogyokai Kikaku (Japanese Electric Machine Industrial Institute Standards) RC-3698B, and failure rate and change in volume were examined after thses tests. The results obtained are set forth in Tables 3 and 4, respectively.

In this case, the tests above were accomplished in accordance with the aforesaid standards, i.e., in the instance where the high-temperature load test is concerned, a state due to the application of a 50 V DC and propoerties after 1000 hours at 125° C. were measured; in the instance where the moisture-resistant test is concerned, a state due to the application of a 25 V DC and properties after 500 hours at 40° C. and at 95% RH were measured.

TABLE 3

|  | Failure Rate (%) | Rate of Change in Capacitance (%) |
|---|---|---|
| Example 24 | 0 | −5 |
| Example 27 | 0 | −2 |
| Reference Example 4 | 3 | −15 |
| Reference Example 5 | 1 | −11 |
| Example 57 | 0 | −4 |
| Example 61 | 1 | −3 |
| Reference Example 10 | 3 | −12 |
| Reference | 2 | −11 |

TABLE 3-continued

|  | Failure Rate (%) | Rate of Change in Capacitance (%) |
| --- | --- | --- |
| Example 11 |  |  |

TABLE 4

|  | Failure Rate (%) | Rate of Change in Capacitance (%) |
| --- | --- | --- |
| Example 24 | 0 | −4 |
| Example 27 | 1 | −5 |
| Reference Example 4 | 6 | −13 |
| Reference Example 5 | 3 | −10 |
| Example 57 | 0 | −6 |
| Example 61 | 0 | −5 |
| Reference Example 10 | 5 | −13 |
| Reference Example 11 | 3 | −11 |

As is definite from Tables 3 and 4, it has been confirmed that when a small amount of MnO is added to the composition, the capacitor made from this composition will noticeably improve in the failure rate, and will be reduced in the rate of the change in capacitance, and will be excellent in the high-temperature load properties and the moisture resistance.

Furthermore, by using $Pb(Fe_{\frac{1}{2}}Nb_{\frac{1}{2}})O_3\text{-}M(Cu_{\frac{1}{2}}W_{\frac{1}{2}})O_3$ (M represents Ba or Ca) binary system material composition, a mechanical strength thereof was measured. As the result, excellent mechanical strength was obtained.

Namely, the mechanical bending strength of each Examples 52 and 53 was mesured. Measurement method thereof is the same as mentioned above and the results are shown in Table 5.

TABLE 5

|  | Bending strength [kg/cm²] |
| --- | --- |
| Example 52 | 1050 |
| Example 53 | 1120 |

As is apparent from the Table, $Pb(Fe_{\frac{1}{2}}Nb_{\frac{1}{2}})O_3\text{-}M(Cu_{\frac{1}{2}}\text{-}W_{\frac{1}{2}})O_3$ (M represents Ba or Ca) binary system show more than 1000 kg/cm² of the bending strength which is the value almost comparative to that of BaTiO₃ ceramic which is mainly used as a dielectric for the multilayer ceramic capacitor.

Although oxides and carbonates were used as starting materials in the aforesaid Examples, it is a matter of course that similar effects can be obtained likewise by using organic metallic compounds such as oxalates, in place of the oxides, at a high temperature.

As is apparent from the foregoing, according to this invention, low-temperature sintering type ceramic composition having a high dielectric constant can be obtained which are high in the dielectric constant, are excellent in the temperature properties of the tan δ, the bias dependence of the dielectric constant and the mechanical strength, and are improved in the high-temperature load properties and the moisture resistance. Hence, the compositions according to this invention are considered to be extremely excellent on an industrial application.

We claim:

1. A ceramic composition having a high dielectric constant consisting essentially of lead oxide, iron oxide, niobium oxide, tungsten oxide, copper oxide, and at least one of barium oxide and calcium oxide, said ceramic composition being represented by the formula:

$$xPb(Fe_{\frac{1}{2}}Nb_{\frac{1}{2}})O_3\text{-}yM(Cu_{\frac{1}{2}}W_{\frac{1}{2}})O_3\text{-}zPb(Fe_{\frac{2}{3}}W_{\frac{1}{3}})O_3$$

wherein M is at least one of Ba and Ca, and wherein x, y and z are defined as follows:

| [A:] | x = 65, | y = 5, | z = 30, or |
| --- | --- | --- | --- |
| [B:] | x = 90, | y = 10, | z = 0, or |
| [C:] | x = 65, | y = 0.5, | z = 34.5, or |
| [D:] | x = 99.5, | y = 0.5, | z = 0 |

2. A ceramic composition according to claim 1, wherein said ceramic composition is represented by the formula:

$$xPb(Fe_{\frac{1}{2}}Nb_{\frac{1}{2}})O_3\text{-}yM(Cu_{\frac{1}{2}}W_{\frac{1}{2}})O_3$$

wherein x and y satisfy the relations of $90 \leq x \leq 99.5$ and $0.5 \leq y \leq 10$, respectively.

3. A ceramic composition according to claim 2, further consisting essentially of 1.0% by weight or less, with respect to said ceramic composition, of manganese oxide.

4. A ceramic composition according to claim 1, further consisting essentially of 1.0% by weight or less, with respect to said ceramic composition, of manganese oxide.

* * * * *